United States Patent
Sweeney et al.

(10) Patent No.: US 11,325,303 B2
(45) Date of Patent: May 10, 2022

(54) THREE DIMENSIONAL PRINTER APPARATUS

(71) Applicant: Essentium, Inc., Pflugerville, TX (US)

(72) Inventors: Charles Brandon Sweeney, Pflugerville, TX (US); Blake Teipel, Pflugerville, TX (US); Travis Eubanks, San Antonio, TX (US); John Stockton, Austin, TX (US); Alexander Stockton, Austin, TX (US)

(73) Assignee: Essentium, Inc., Pflugerville, TX (US)

( * ) Notice: Subject to any disclaimer, the term of this patent is extended or adjusted under 35 U.S.C. 154(b) by 72 days.

(21) Appl. No.: 16/467,693

(22) PCT Filed: Nov. 3, 2017

(86) PCT No.: PCT/US2017/059878
§ 371 (c)(1),
(2) Date: Jun. 7, 2019

(87) PCT Pub. No.: WO2018/132157
PCT Pub. Date: Jul. 19, 2018

(65) Prior Publication Data
US 2019/0344502 A1    Nov. 14, 2019

Related U.S. Application Data

(60) Provisional application No. 62/416,890, filed on Nov. 3, 2016.

(51) Int. Cl.
*B29C 64/209*    (2017.01)
*B29C 64/118*    (2017.01)
*B33Y 30/00*    (2015.01)

(52) U.S. Cl.
CPC ......... *B29C 64/209* (2017.08); *B29C 64/118* (2017.08); *B33Y 30/00* (2014.12)

(58) Field of Classification Search
CPC ...... B29C 64/20; B29C 64/209; B29C 64/118
See application file for complete search history.

(56) References Cited

U.S. PATENT DOCUMENTS 2,542,589 A * 2/1951 Stanton .................... H05B 6/54
                                                            219/780
5,807,437 A    9/1998 Sachs et al.
(Continued)

FOREIGN PATENT DOCUMENTS

CN    104708828 A    6/2015
CN    106029333 A    10/2016
(Continued)

OTHER PUBLICATIONS

Gannon, Christopher J., et al. "Carbon nanotube-enhanced thermal destruction of cancer cells in a noninvasive radiofrequency field." Cancer 110.12 (2007): 2654-2665.
(Continued)

*Primary Examiner* — Joseph S Del Sole
*Assistant Examiner* — Ariella Machness
(74) *Attorney, Agent, or Firm* — Vivacqua Crane, PLLC

(57) ABSTRACT

A three-dimensional printing apparatus for manufacturing a three-dimensional object includes a controller comprising a signal generator and a three-dimensional printer. The three-dimensional printer includes a print head, a three-dimensional object carrier, and an electrical field applicator. The electrical field applicator is disposed on an end of the print head. The controller is in communication with the print head, part carrier, and electrical field applicator. The three dimensional printer builds the three-dimensional object onto the three-dimensional object carrier. The signal generator outputs a signal to the electrical field applicator and the
(Continued)

electrical field applicator generates an electrical field incident to the three-dimensional object on three-dimensional object carrier.

17 Claims, 7 Drawing Sheets

(56) References Cited

U.S. PATENT DOCUMENTS

| | | | |
|---|---|---|---|
| 7,725,209 | B2 | 5/2010 | Menchik et al. |
| 9,662,840 | B1 | 5/2017 | Buller et al. |
| 10,513,080 | B2 * | 12/2019 | Kim ............... B33Y 10/00 |
| 2002/0079121 | A1 | 6/2002 | Ryan et al. |
| 2003/0199251 | A1 * | 10/2003 | Gorbold ............ H05B 6/54 |
| | | | 455/66.1 |
| 2011/0134170 | A1 | 6/2011 | Addy |
| 2015/0042017 | A1 | 2/2015 | Ramaswamy et al. |
| 2015/0053656 | A1 | 2/2015 | Popp et al. |
| 2015/0291833 | A1 | 10/2015 | Kunc et al. |
| 2015/0360427 | A1 | 12/2015 | Shah et al. |
| 2016/0016369 | A1 | 1/2016 | Tarbutton et al. |
| 2016/0096327 | A1 | 4/2016 | Fry et al. |
| 2016/0271874 | A1 * | 9/2016 | Tsai ................. B33Y 30/00 |
| 2016/0325487 | A1 | 11/2016 | Miller |
| 2016/0325491 | A1 | 11/2016 | Sweeney et al. |
| 2017/0151704 | A1 | 6/2017 | Go et al. |
| 2017/0341183 | A1 | 11/2017 | Buller et al. |

FOREIGN PATENT DOCUMENTS

| | | |
|---|---|---|
| WO | 2013152805 A1 | 10/2013 |
| WO | 2015147939 A1 | 10/2015 |
| WO | 2015191757 A1 | 12/2015 |
| WO | 2016051163 A1 | 4/2016 |
| WO | WO-2016060703 A1 * | 4/2016 ............. B22F 10/20 |
| WO | 2016154103 A1 | 9/2016 |
| WO | 2017210490 A1 | 12/2017 |
| WO | 2018132157 A2 | 7/2018 |

OTHER PUBLICATIONS

Moran, Christine H., et al. "Size-dependent joule heating of gold nanoparticles using capacitively coupled radiofrequency fields." Nano Research 2.5 (2009): 400-405.

International Search Report and Written Opinion, PCT/US2017/059878, dated Aug. 6, 2018, pp. 3-5.

First Office Action in 201880013621X, China National Intellectual Property Administration, dated Jan. 15, 2021.

European Search Report in 18756979.3, European Patent Office, dated Sep. 17, 2020.

International Preliminary Report on Patentability in PCT/US18/18629, International Searching Authority WIPO dated May 24, 2019.

International Search Report and Written Opinion in PCT/US18/18629, International Searching Authority WIPO dated Apr. 8, 2018.

International Preliminary Report on Patentability in PCT/US18/33409, International Searching Authority WIPO dated Nov. 19, 2019.

International Search Report and Written Opinion in PCT/US18/33409, International Searching Authority WIPO dated Sep. 17, 2018.

* cited by examiner

THREE DIMENSIONAL PRINTER APPARATUS

CROSS REFERENCE TO RELATED APPLICATIONS

This application is a national stage completion of PCT/US2017/059878, filed on Nov. 3, 2017, which claims the benefit of U.S. Provisional Application No. 62/416,890 filed Nov. 3, 2016. The disclosure of the above applications are incorporated herein by reference.

FIELD

The present disclosure relates generally to an apparatus and system for heating polymer composites for enhanced bonding of 3D printed parts.

BACKGROUND

The statements in this section merely provide background information related to the present disclosure and may or may not constitute prior art.

Three Dimensional Printing or Additive Manufacturing represents several processes for creating three dimensional objects from a digital CAD design model. A three dimensional printed part is formed by stacking several two dimensional layers of material such that the end result is an object having length, width, and height. In several of the processes, materials used to form the objects can range from metal to thermoplastic and composite. However, while these processes are capable of quickly producing intricate parts including great detail, the current processes seem capable of producing objects having only very limited purposes. Such purposes include prototype parts, novelty objects, demonstration parts or assemblies, or parts having other light duty purposes. This limited use is mainly due to the ability of the additive assembly processes to produce parts having high cohesive strength between several two dimensional layers of the printed part.

Some process improvements include attempts to increase the cohesive strength between the layers of the three dimensional printed object. These attempts include in-process and post-process steps that involve different methods of heating the printed object such that the layers soften or even melt to promote cross-solidification or crystallization between the layers. However, heating the entire three dimensional part either in-process or post-process may result in distortion of the part through sagging and lingering residual stresses, among other defects.

While current three dimensional printers and processes achieve their intended purpose, there is a need for an improved three dimensional printer and process for providing parts for an increasing array of applications requiring improved strength, dimensional capability, and multi-functional purposes.

SUMMARY

Other aspects and advantages of the invention will be explained in further detail by reference to the following description and appended drawings.

A three-dimensional printing apparatus for manufacturing a three-dimensional object is provided. The three-dimensional printing apparatus includes a controller comprising a signal generator and a three-dimensional printer. The three-dimensional printer includes a print head, a three-dimensional object carrier, and an electrical field applicator. The electrical field applicator is disposed on an end of the print head. The controller is in communication with the print head, part carrier, and electrical field applicator. The three dimensional printer builds the three-dimensional object onto the three-dimensional object carrier. The signal generator outputs a signal to the electrical field applicator and the electrical field applicator generates an electrical field incident to the three-dimensional object on three-dimensional object carrier.

In one example of the present invention, the signal output to the electrical field applicator comprises a radio frequency (RF) signal.

In another example of the present invention, the RF signal comprises a frequency of less than approximately 433.92 MHz.

In yet another example of the present invention, the RF signal comprises a frequency of less than approximately 915 MHz.

In yet another example of the present invention, the electrical field applicator comprises a first and a second plurality of electrodes. Each electrode of the first plurality of electrode alternate with each of the electrodes of the second plurality of electrodes.

In yet another example of the present invention, the first plurality of electrodes of the electrical field applicator are connected to the signal generator and the second plurality of electrodes are grounded.

In yet another example of the present invention, the electrical field applicator is a disc and the first plurality of electrodes is concentric with the second plurality of electrodes.

In yet another example of the present invention, the electrical field applicator is an elongated plate. The first plurality of electrodes is connected to a first bus bar strip. The second plurality of electrodes is connected to a second bus bar strip. The first bus bar strip is connected to the signal generator. The second bus bar strip is connected to the ground.

In yet another example of the present invention, the three-dimensional object carrier is electrically grounded.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
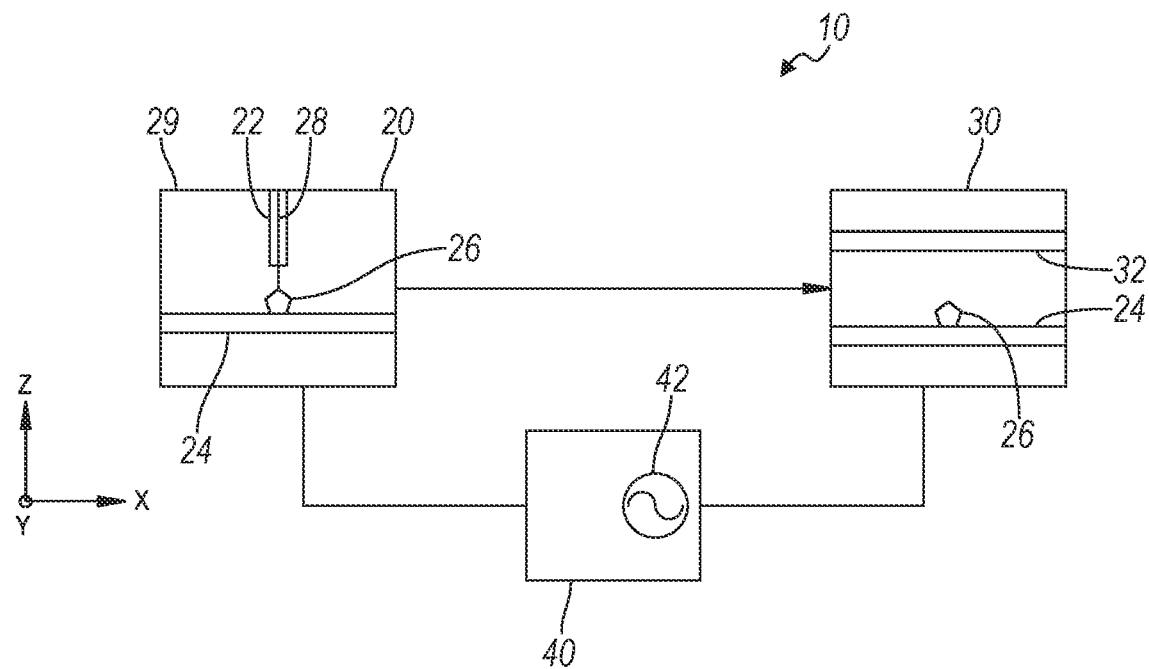
FIG. 1A depicts a three dimensional printing apparatus for performing a three dimensional printing process according to the principles of the present invention.

Referring to FIG. 1A, a schematic of a three dimensional printing apparatus 10 is illustrated and will now be described. The three dimensional printing apparatus 10 includes a three dimensional printer 20, and an electric field applicator apparatus 30, and a controller 40. More particularly, the three dimensional printer 20 includes a printing head 22, a three-dimensional object or part carrier 24, a supporting structure such as a Cartesian gantry, and a delta-style structure or a robotic arm 29 that supports the print head 22. A three dimensional object or part 26 is initiated and built upon the part carrier 24 as a filament 28 passes through the print head 22, softens or melts in the print head 22, and is deposited on the part carrier 24 or a previous layer of the three dimensional part 26. One of or both the print head 22 and the part carrier 24 are capable of movement in the x, y, and z directions, or a combination of these directions composing circular or curved patterns, for depositing the softened or melted filament onto the previous layers of the three dimensional part 26.

The electrical field applicator apparatus 30 includes an electrical field applicator 32 and the part carrier 24. After the three dimensional part 26 is at least partially completed, the electrical field applicator moves over the three dimensional part or otherwise in sufficiently close proximity to the three dimensional part 26 placing three dimensional part 26 under or incident within the electrical field created by applicator 32 which will be described in further detail below.

The controller 40 is preferably an electronic control device having a preprogrammed digital computer or processor, control logic, memory used to store data, and at least one I/O peripheral. The control logic includes a plurality of logic routines for monitoring, manipulating, and generating data. The controller 40 controls the operation the three dimensional printer 20 and the electrical field applicator apparatus 30. The control logic may be implemented in hardware, software, or a combination of hardware and software. For example, control logic may be in the form of program code that is stored on the electronic memory storage and executable by the processor. The controller 40 provides control signals, generated by a CAD model data program, to the gantry 29, print head 22 and part carrier 24 thus producing the three dimensional part 26.

A further feature of the controller 40 is a signal generator 42 that outputs a signal to the electrical field applicator 32. The signal generator 42 preferably provides an RF frequency signal of less than approximately 433.92 MHz or 915 MHz. These frequencies provide a signal that is 69.1 cm and 32.8 cm in wavelength respectively. When a longer wavelength is selected, the selected electric field applicator 32 may be operated in an electrically small mode. In this manner, the selected electrical applicator 32 has characteristic dimensions less than or equal to approximately one-eighth of the wavelength shaping the electric field. When operated in this electrically small mode, resonant nodes in the form of standing waves are suppressed or eliminated resulting in a more uniform heating of the three dimensional part 26.

Figure 1B:
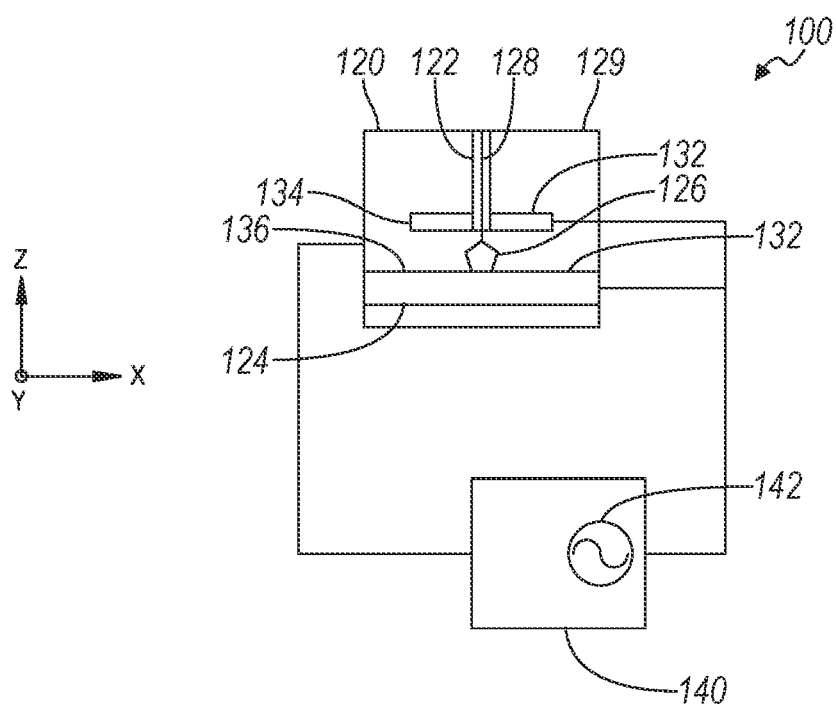
FIG. 1B depicts a three dimensional printing apparatus for performing a three dimensional printing process according to the principles of the present invention.

Referring now to FIG. 1B, another example of the present invention is illustrated and will now be described. The three dimensional printing apparatus 100 includes a three dimensional printer 120 and a controller 140. Specific to this example, the three dimensional printer includes a print head 122, a part carrier 124 and an electrical field applicator 132. Proceeding in common with the example shown in FIG. 1A, a three dimensional part 126 is initiated and built upon the part carrier 124 as a filament 128 passes through the print head 122, softens or melts in the print head 122, and is deposited on the part carrier 124 or a previous layer of the three dimensional part 126. One of or both the print head 122 and the part carrier 124 are capable of movement in the x, y, and z directions, or a combination of these directions for composing circular or curved patterns for depositing the filament 128 onto the previous layers of the three dimensional part 126. As stated, the electrical field generator 132 is contained in the three dimensional printer 120. In one example, the electrical field generator 132 is attached to the print head 122 in the form of an electrical field generator print head 134. In another example, the electrical field generator 132 is attached to the part carrier 124 in the form of an electrical field generator part carrier 136. In one example of the electrical field generator 132, the electrical field generator print head 134 and the electrical field generator part carrier 136 can be contained within the three dimensional printer 120 without departing from the scope of the invention. More details of each of the electrical field generator print head 134 and the electrical field generator part carrier 136 are provided below.

As with the controller 40 shown in FIG. 1A, the controller 140 of FIG. 1B is preferably an electronic control device having a preprogrammed digital computer or processor, control logic, memory used to store data, and at least one I/O peripheral. The control logic includes a plurality of logic routines for monitoring, manipulating, and generating data. The controller 140 controls the operation of the three dimensional printer 120. The control logic may be implemented in hardware, software, or a combination of hardware and software. For example, control logic may be in the form of program code that is stored on the electronic memory storage and executable by the processor. The controller 140 provides control signals, generated by a CAD model data program, to the gantry 29, print head 122 and part carrier 124 thus producing the three dimensional part 126.

A further feature of the controller 140 is a signal generator 142 that outputs a signal to the electrical field applicator 132. The signal generator 142 preferably provides an RF frequency signal of less than approximately 433.92 MHz or 915 MHz. These frequencies provide a signal that is 69.1 cm and 32.8 cm in wavelength respectively. When a longer wavelength is selected, the selected electric field applicator 132 may be operated in an electrically small mode. In this manner, the selected electrical applicator 132 has characteristic dimensions less than or equal to approximately one-eighth of the wavelength shaping the electric field. When operated in this electrically small mode, resonant nodes in the form of standing waves are suppressed or eliminated resulting in a more uniform heating of the three dimensional part 126.

Figure 2:
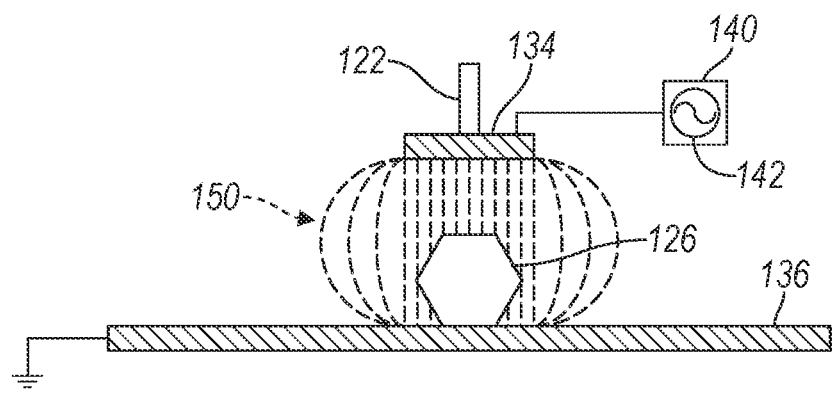
FIG. 2 is a side view of an apparatus used in a method of three dimensional printing according to the principles of the present invention.

Turning now to FIG. 2, a more detailed version of the electrical field applicator 132 of FIG. 1B is illustrated and will now be described. The electrical field applicator 132 of the three dimensional printer 120 includes an upper plate 134 disposed parallel to a lower plate 136. More particularly, the upper plate 134 is integrated with the print head 122 or other member of the three dimensional printer 120. The lower plate 136 is mounted to or integrated with the part carrier 124. Preferably, the lower plate 136 is a grounded, conductive plate while the signal generator 142 of the controller 140 provides a high voltage potential to the upper plate 134. Thus, the resulting RF signal 150 generated between the upper and lower plates 134, 136 penetrates the three dimensional part 126.

Figure 3A:
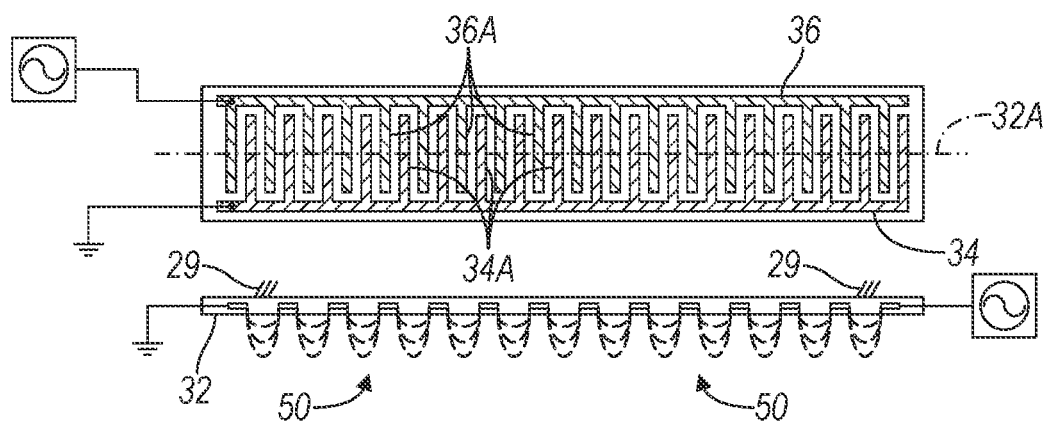
FIG. 3A is a top view of an apparatus used in a method of three dimensional printing according to the principles of the present invention.
Figure 3B:
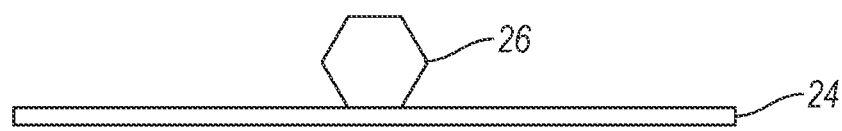
FIG. 3B is a side view of an apparatus used in a method of three dimensional printing according to the principles of the present invention.
Figure 3C:
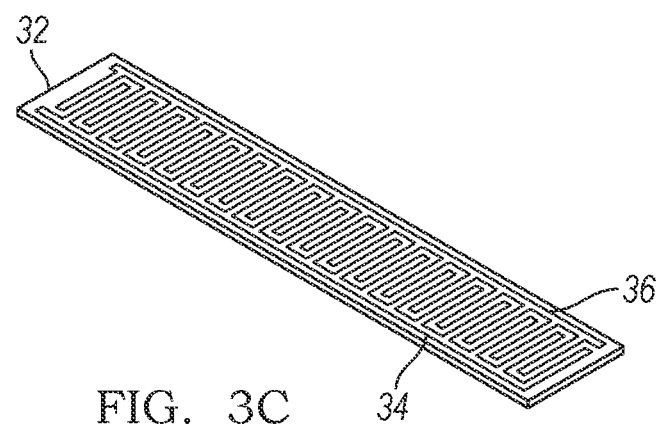
FIG. 3C is a perspective view of an apparatus used in a method of three dimensional printing according to the principles of the present invention.

Turning now to FIGS. 3A-3C, another example of the electrical field applicator is illustrated and will now be described. The electrical field applicator 32 includes a first and second bus bar strip 34, 36 extending longitudinally down the long edges 38 of the electrical field applicator 32. The first bus bar strip 34 includes a first set of electrodes 34A extending toward the longitudinal center 32A of the electrical field applicator 32. The second bus bar strip 36 includes a second set of electrodes 36A extending toward the center 32A of the electrical field applicator 32. The first set of electrodes 34A are disposed on the electrical field applicator 32 to alternate with the second set of electrodes 36A. The first bus bar strip 34 is connected to the signal generator 42 of the controller 40 while the second bust bar strip 36 is grounded. Thus, the resulting RF signal 50 generated between the first electrodes 34A of the first bus bar strip 34 and the second electrodes 36A of the second bus bar strip 36 penetrates the three dimensional part 26.

As shown more particularly in FIG. 3B, the electrical field applicator 32 may be supported by the three dimensional printer 20 by way of the print head 22 or the gantry 29 that supports the print head 22. Relative to the part carrier 24, the electrical field applicator 32 is moveable to selectively direct RF signals in specific portions of the part 26.

Figure 4A:
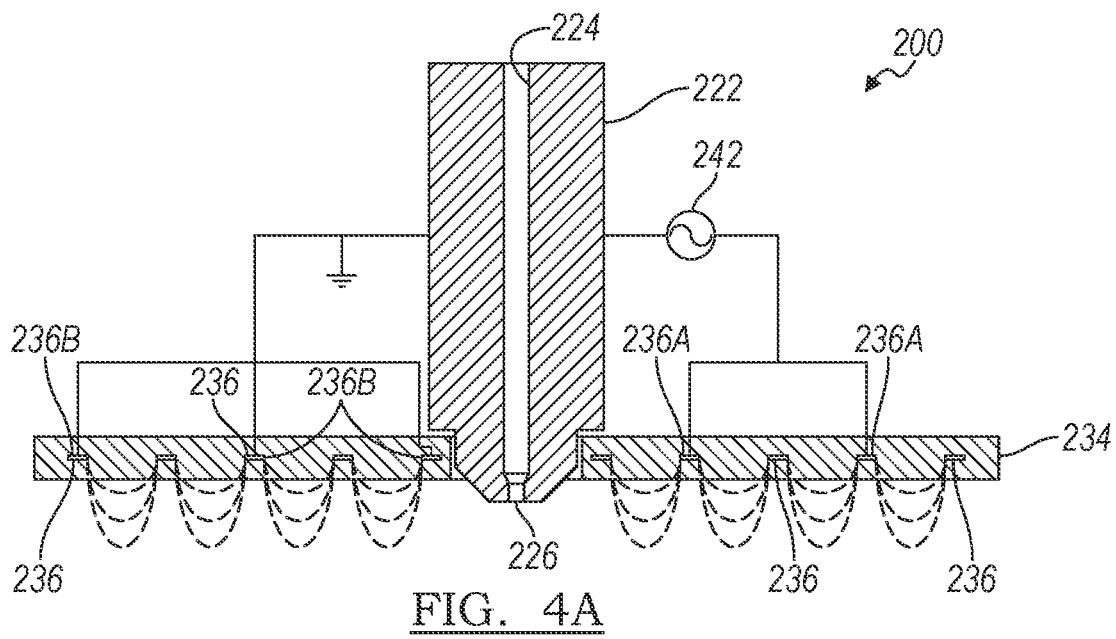
FIG. 4A is a cross-section view of an apparatus used in a method of three dimensional printing according to the principles of the present invention.
Figure 4B:
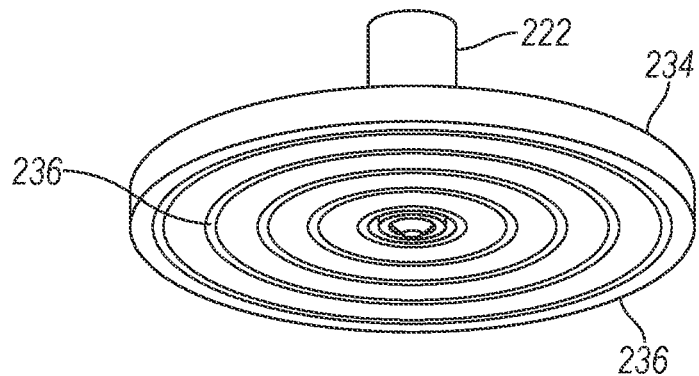
FIGS. 4B-4C are perspective views of an apparatus used in a method of three dimensional printing according to the principles of the present invention.
Figure 4C:
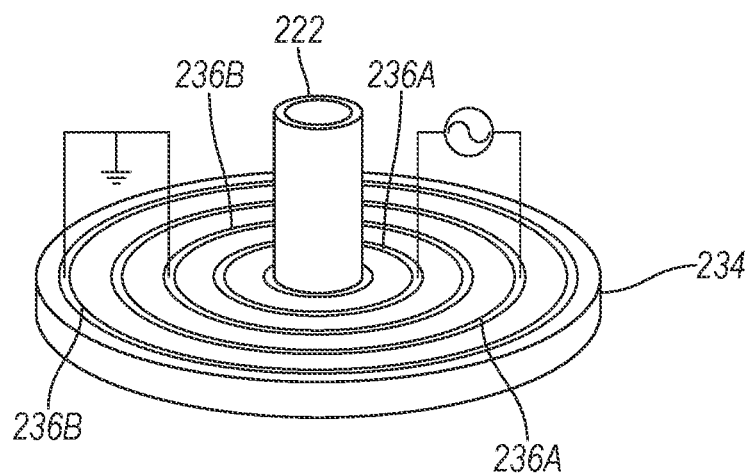
Figure 5A:
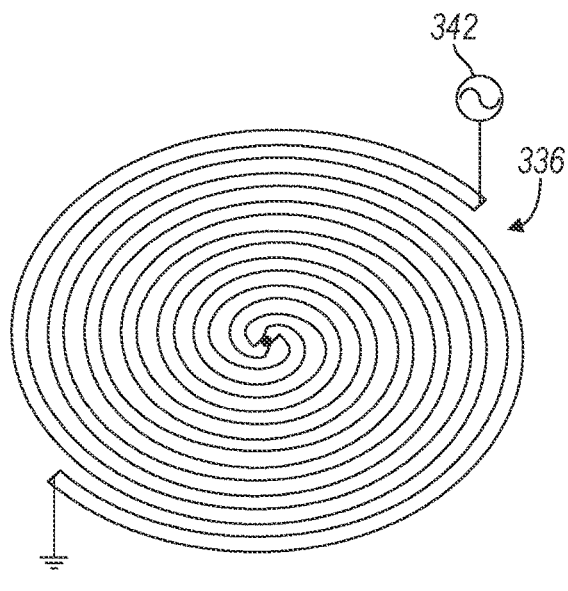
FIGS. 5A-5D are schematic views of an apparatus used in a method of three dimensional printing according to the principles of the present invention.
Figure 5B:
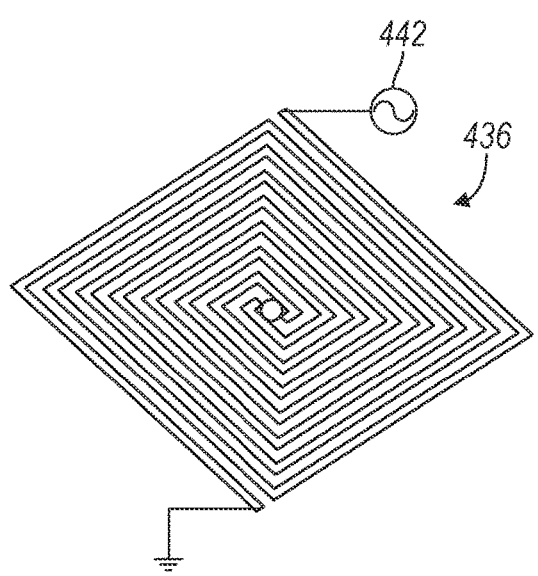
Figure 5C:
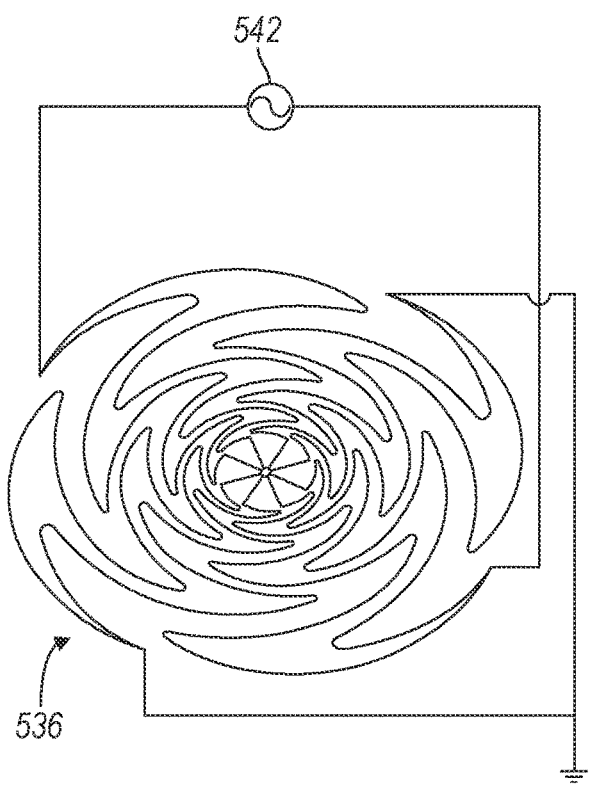
Figure 5D:
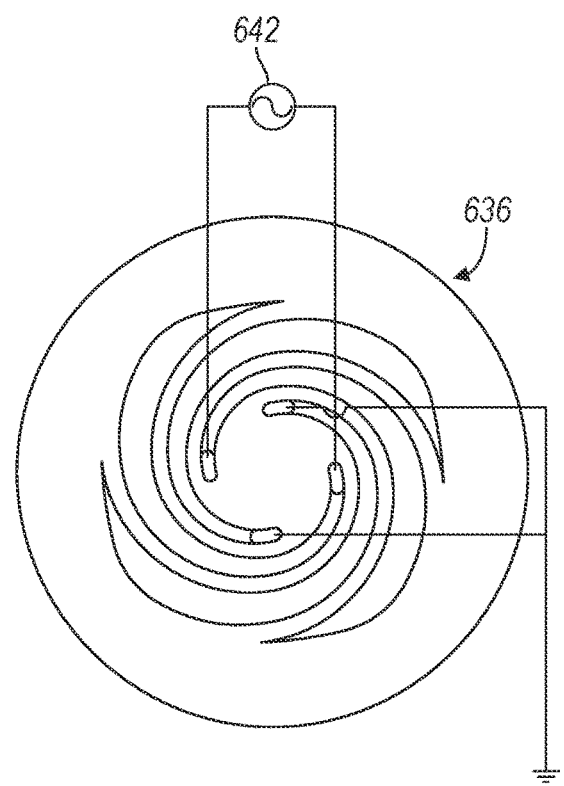

Referring now to FIGS. 4A-4C, a print head and electrical field applicator assembly 200 is illustrated in greater detail and will now be described. The print head and electrical field applicator assembly 200 has similar components to FIG. 1B including a print head 222 and an electrical field applicator 234. More particularly, the print head 222 includes a center bore 227 and a nozzle or tip 226. A filament is inserted into the center bore 224, melted or softened, and extruded through the nozzle 226 to form the three dimensional part (as shown in FIG. 1A). The electrical field applicator 234 is a disc shaped member fixed to the lower portion of the print head 222 proximate to the nozzle 226 and includes, in this example, a series of circular electrodes 236 concentric with the center of the electrical field applicator 234, and either imbedded within the electrical field applicator 234 or otherwise secured to the surface of the electrical field applicator 234. The electrodes 236 are mounted into a dielectric matrix formed into a general toroidal shape. The electrical field applicator 234 may alternatively be mounted under the gantry 129 or on a separate linear stage capable of scanning over the part carrier 24 as shown in FIG. 1A. A signal generator 242 is connected to an alternating first set of electrodes 236A while an adjacent second set of electrodes 236B are grounded. Thus, the resulting RF signal 250 generated between the first set of electrodes 236A of the second set of electrodes 236B penetrates the three dimensional part. The scanning rate and sequence is determined and operated by a computer-controlled program of the controller 240 optimized to achieve the desired heating profile.

Turning now to FIGS. 5A-5D, several examples of the shape of the electrodes 336, 436, 536, 636 embedded on an electrical field applicator are shown. As described in the previous example, adjacent electrodes alternate between connections to a signal wave generator 342, 442, 542, 642 and grounded connections. In this manner, the shape of the RF signal can be tailored to a particular application thus improving the effectiveness and efficiency of the three dimensional printing process.

The electrodes 336, 436, 536, 636 may be supported by a dielectric for structural strength, or it may be free floating in air if the electrodes 336, 436, 536, 636 are able to support their own weight. Arcing electric fields extend out of plane from the spiral and interact with the 3D printed part. The electrodes 336, 436, 536, 636 may be mounted around the printer nozzle as shown in FIG. 4A, under the 3D printer gantry, or on a separate linear stage capable of scanning over the part carrier 24 as shown in FIG. 1A.

Figure 6:
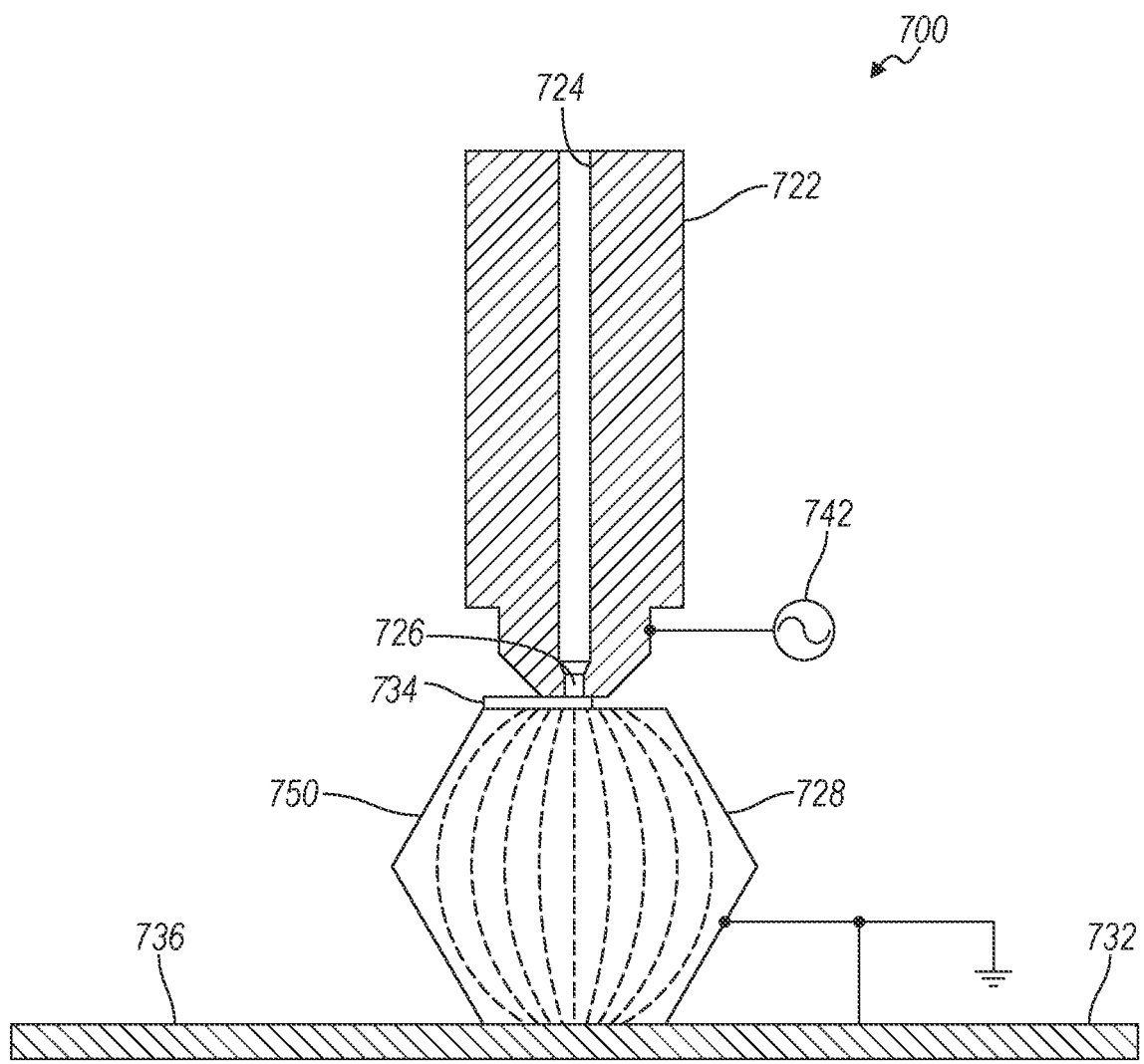
FIG. 6 is a cross-section view of an apparatus used in a method of three dimensional printing according to the principles of the present invention.

Referring now to FIG. 6, a print head and electrical field applicator assembly 700 is illustrated in greater detail and will now be described. The print head and electrical field applicator assembly 700 has similar components to FIG. 1B including a print head 722 and an electrical field applicator 734. More particularly, the print head 722 includes a center bore 724 and a nozzle or tip 726. A filament is inserted into the center bore 724, melted or softened, and extruded through the nozzle 726 to form the three dimensional part 728. The electrical field applicator 734 includes the lower portion of the print head 722 and a part carrier 736. A signal generator 742 is connected to the print head 722 which acts as a first electrode while the part carrier 736 and part 728 are grounded thus acting as the second electrode. Thus, the resulting RF signal 750 generated between the first electrode or print head 722 and the part carrier 736 and part 728 penetrates the three dimensional part 728. The scanning rate and sequence is determined and operated by a computer-controlled program of the controller (shown in FIG. 1A) optimized to achieve the desired heating profile.

Figure 7:
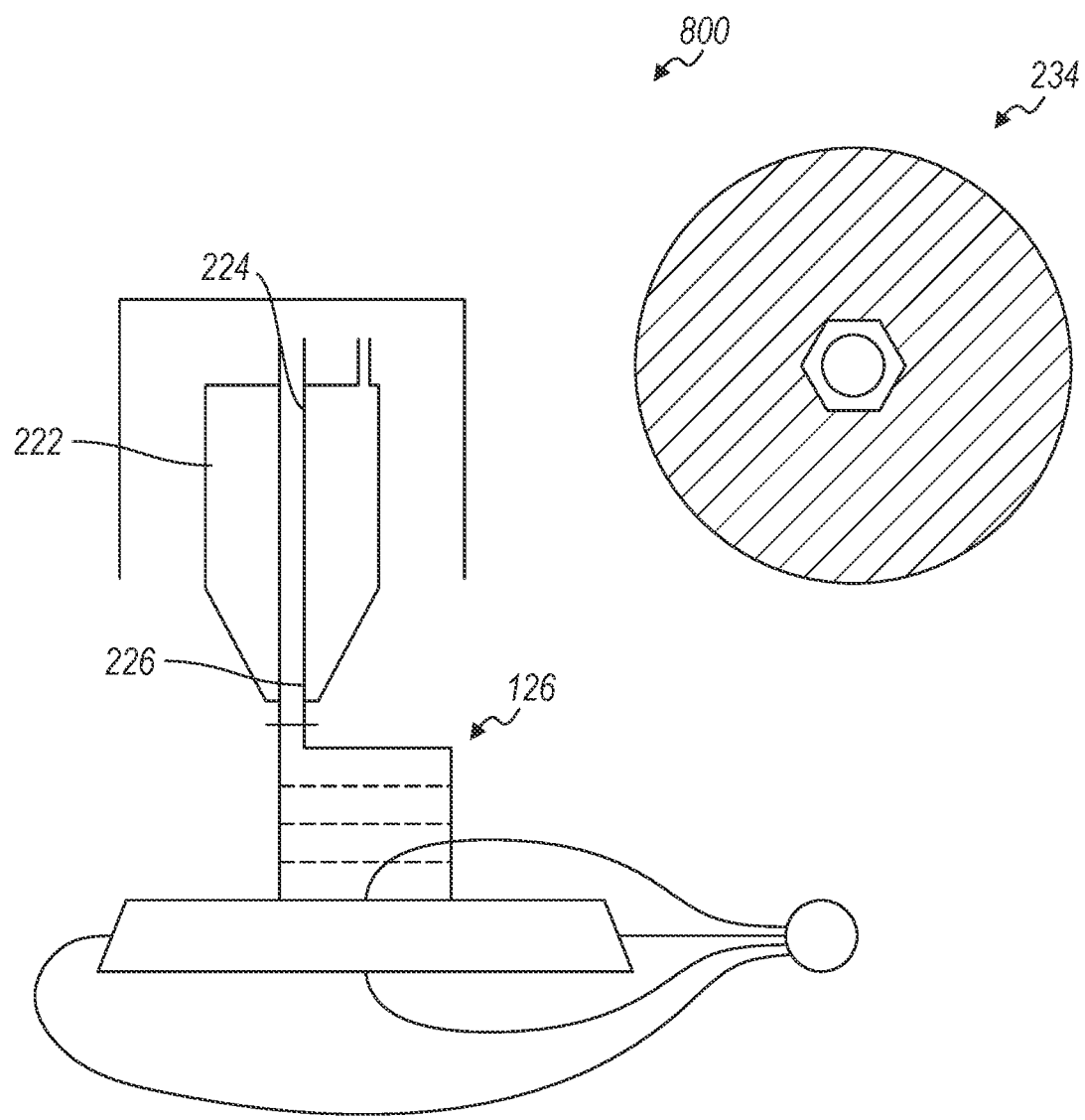
FIG. 7 is a cross-section view of an apparatus used in a method of three dimensional printing according to the principles of the present invention.

Referring now to FIG. 7, a print head and electrical field applicator assembly 800 is illustrated in greater detail and will now be described. The print head and electrical field applicator assembly 800 includes an electrical field applicator that operates by applying an alternating or direct current power source to a conductor in physical contact with the 3D printed part while using a second conductor touching the 3D printed part as the ground for the energy. The energy applied to the direct contact applicator travels through the 3D printed part Ike current flowing through a wire. The direct contact applicator may be mounted around the printer nozzle, under the 3D printer gantry, or on a separate linear stage capable of scanning over the build plate. The simplest realization of this applicator is the conductive 3D print nozzle, but any other conductive shape would also perform the same function.

Figure 8:
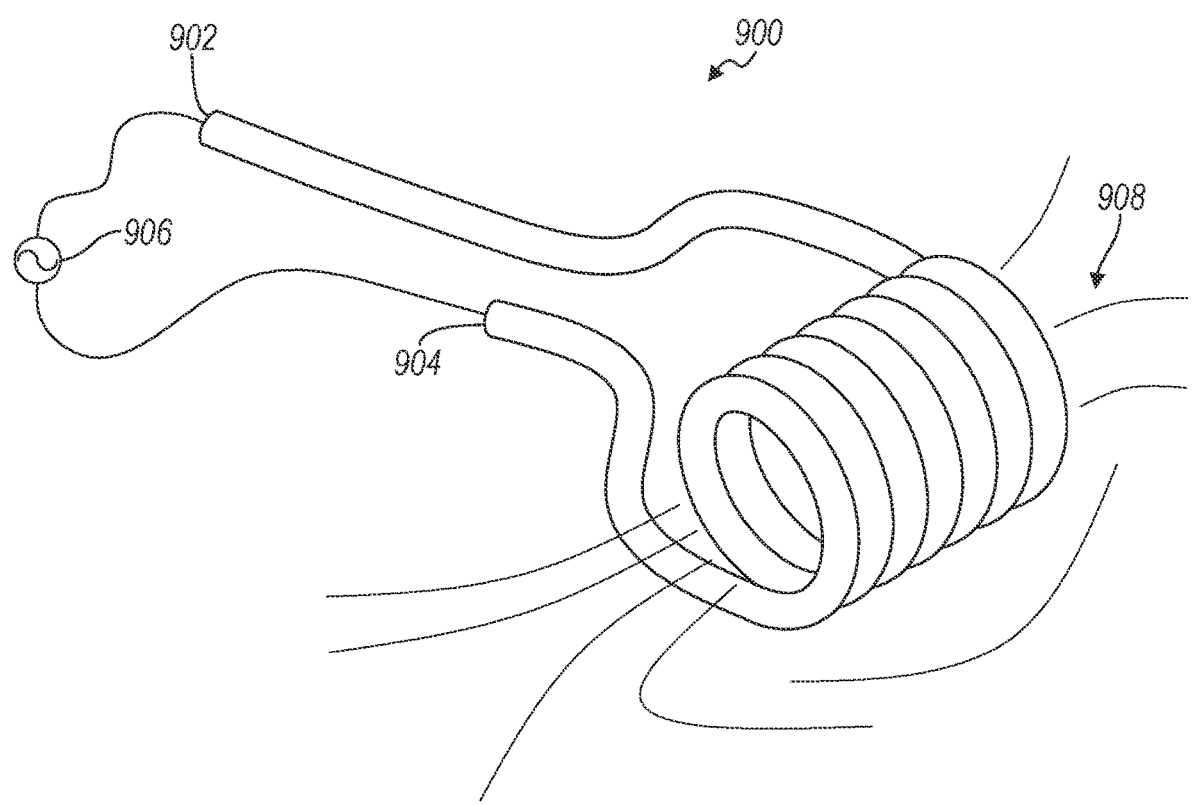
FIG. 8 is a perspective view of an induction coil used in a method of three dimensional printing according to the principles of the present invention.

Referring now to FIG. 8, an electrical field applicator 900 is illustrated in greater detail and will now be described. The electrical field applicator 900 is in the shape of a coil having a first end 902 and a second end 904. The first end 902 and the second end 904 are connected to a signal generator 906. The alternating magnetic field 908 produced by the coil wraps around the coil to oscillate the molecules of ferromagnetic or magnetically lossy materials in close proximity (including the print nozzle), causing them to heat through molecular friction. The inductive coil applicator may be mounted around the printer nozzle, under the 3D printer gantry, or on a separate linear stage capable of scanning over the build plate.

The description of the invention is merely exemplary in nature and variations that do not depart from the spirit of the invention are intended to be within the scope of the invention. Such variations are not to be regarded as a departure from the spirit and scope of the invention.

We claim:

1. A three-dimensional printing apparatus for manufacturing a three-dimensional object, the apparatus comprising:
    a controller comprising a signal generator;
    a three-dimensional printer comprising a print head, a three-dimensional object carrier, and an electrical field applicator, and wherein the electrical field applicator is disposed on an end of the print head and the electrical field applicator is in the form of a plate including at least one electrode embedded in the plate, the controller is in communication with the print head, the three-dimensional object carrier, and the electrical field applicator, and the three dimensional printer builds the three-dimensional object onto the three-dimensional object carrier; and
    wherein the signal generator outputs a signal to the electrical field applicator and the electrical field applicator generates an electrical field configured to be incident to the three-dimensional object on the three-dimensional object carrier;
    wherein the electrical field applicator is configured to operate in an electrically small mode.

2. The three-dimensional printing apparatus of claim 1 wherein the signal is configured to penetrate the three-dimensional object.

3. The three-dimensional printing apparatus of claim 1 wherein the signal comprises an RF signal having a frequency of less than approximately 915 MHz.

4. The three-dimensional printing apparatus of claim 1 wherein the at least one electrode comprises a first and a second plurality of electrodes embedded in the plate, each electrode of the first plurality of electrodes alternates with each of the electrodes of the second plurality of electrodes.

5. The three-dimensional printing apparatus of claim 4 wherein the first plurality of electrodes of the electrical field applicator are connected to the signal generator and the second plurality of electrodes are grounded.

6. The three-dimensional printing apparatus of claim 5 wherein the electrical field applicator is a disc and the first plurality of electrodes is concentric with the second plurality of electrodes.

7. The three-dimensional printing apparatus of claim 4 wherein the electrical field applicator is an elongated plate, the first plurality of electrodes is connected to a first bus bar strip, the second plurality of electrodes is connected to a second bus bar strip, the first bus bar strip is connected to the signal generator, and the second bus bar strip is connected to the ground.

8. The three-dimensional printing apparatus of claim 1 wherein the three-dimensional object carrier is electrically grounded.

9. A three-dimensional printing apparatus for manufacturing a three-dimensional part, the apparatus comprising:
    a controller comprising a signal generator;
    a three-dimensional printer having a print head, and wherein the three-dimensional printer builds the three-dimensional part onto a part carrier and the part carrier is electrically grounded;
    an electrical field applicator apparatus comprising an electrical field applicator, and
    wherein the signal generator outputs a signal to the electrical field applicator and the electrical field applicator generates an electrical field incident to the three-dimensional part on the part carrier and wherein the electrical field applicator is supported by a linear stage configured to scan over the part carrier;
    wherein the electrical field applicator is configured to operate in an electrically small mode.

10. The three-dimensional printing apparatus of claim 9 wherein the RF signal is configured to penetrate the three-dimensional part.

11. The three-dimensional printing apparatus of claim 10 wherein the electrical field applicator comprises a first and a second plurality of electrodes embedded in the electrical field applicator, wherein the electrical field applicator is in the form of a plate, each electrode of the first plurality of electrodes alternates with each of the electrodes of the second plurality of electrodes.

12. The three-dimensional printing apparatus of claim 11 wherein the first plurality of electrodes of the electrical field applicator are connected to the signal generator and the second plurality of electrodes are grounded.

13. The three-dimensional printing apparatus of claim 12 wherein the electrical field applicator is a disc and the first plurality of electrodes is concentric with the second plurality of electrodes.

14. The three-dimensional printing apparatus of claim 11 wherein the electrical field applicator is an elongated plate, the first plurality of electrodes is connected to a first bus bar strip, the second plurality of electrodes is connected to a second bus bar strip, the first bus bar strip is connected to the signal generator, and the second bus bar strip is connected to the ground.

15. A three-dimensional printing apparatus for manufacturing a three-dimensional object, the apparatus comprising:
    a controller comprising a signal generator;
    a three-dimensional printer comprising a print head, a three-dimensional object carrier, and an electrical field applicator, and wherein the electrical field applicator is disposed on an end of the print head and the electrical field applicator is in the form of a plate including at least one electrode embedded in the plate, the controller is in communication with the print head, the three-dimensional object carrier, and the electrical field applicator, and the three dimensional printer builds the three-dimensional object onto the three-dimensional object carrier; and
    wherein the signal generator outputs a signal to the electrical field applicator, the three-dimensional object carrier is electrically grounded, and the electrical field applicator generates an electrical field from the electrical field applicator to the three-dimensional object carrier incident to the three-dimensional object on the three-dimensional object carrier;
    wherein the electrical field applicator is configured to operate in an electrically small mode.

16. The three-dimensional printing apparatus of claim 6 wherein the signal is configured to penetrate the three-dimensional object.

17. The three-dimensional printing apparatus of claim 16 wherein the electrical field applicator is a disc and is a first electrode and the three-dimensional object carrier is a second electrode.

* * * * *